United States Patent [19]

Paarlberg

[11] Patent Number: 5,363,813

[45] Date of Patent: Nov. 15, 1994

[54] DUAL ROCKER SHAFT INTERNAL COMBUSTION DIESEL ENGINE

[76] Inventor: Conrad Paarlberg, 7553 W. State Rd. 8, La Creosse, Ind. 46348

[21] Appl. No.: 88,149

[22] Filed: Jun. 30, 1993

[51] Int. Cl.$^5$ .............................. F02B 53/00
[52] U.S. Cl. .......................... 123/18 R; 123/51 R
[58] Field of Search ............ 123/18 R, 18 A, 51 R, 123/51 B, 90.6

[56] References Cited

U.S. PATENT DOCUMENTS

| | | | |
|---|---|---|---|
| 3,910,238 | 10/1975 | James | 123/18 R |
| 4,027,475 | 6/1977 | Folsom | 123/18 R |
| 4,214,557 | 7/1980 | Beach | 123/18 R |
| 4,884,532 | 12/1989 | Tan et al. | 123/18 R |
| 5,074,253 | 12/1991 | Dettwiler | 123/18 R |
| 5,165,303 | 11/1992 | Riemscheid et al. | 123/90.6 |

*Primary Examiner*—Tony M. Argenbright
*Assistant Examiner*—M. Macy
*Attorney, Agent, or Firm*—S. Pal Asija

[57] ABSTRACT

This invention relates to a novel improvement in diesel engines. A two cycle direct injection internal combustion diesel engine comprising four pistons utilizing two common cylinders, dual rocker shaft (internally including shaft within a shaft), plurality of intake ports, plurality of exhaust ports, water jacket and a single dual throw crankshaft. A single combustion in each cylinder or chamber acts on two pistons in opposite direction. The engine breathes by means of intake and exhaust ports utilizing a charged intake. The opposite rocker motion internally is accomplished by a shaft within a shaft. The rocker motion is transferred to rotary motion via a single dual throw crankshaft.

18 Claims, 8 Drawing Sheets

DUAL ROCKER SHAFT INTERNAL COMBUSTION DIESEL ENGINE

FIELD OF INVENTION

This invention relates to an improved internal combustion diesel engine specifically incorporating a dual rocker shaft. The dual rocker shaft developed by this inventor comprises one shaft inside of anther shaft. The diesel engine of this invention is also known as Conpar engine.

BACKGROUND

Prior art internal combustion diesel engines are inefficient, use too many moving parts. More specifically prior art diesel engines do not use dual rocker shaft let alone a shaft inside another shaft.

PRIOR ART

A prior art search was conducted, and the following U.S. and foreign pedants were uncovered arranged in the reverse chronological order.

13) U.S. Pat. No. 4,884,532 issued to Tan et al on Dec. 5, 1989 for "Swinging Piston Internal Combustion Engine"
12) U.S. Pat. No. 4,569,314 issued to Petre Milu of Bucharest Romania on Feb. 11, 1986 for "Two Stroke Axial Pistons Engine"
11) U.S. Pat. No. 4,543,917 issued to James Lapeyre on Oct. 1, 1985 for "Internal Combustion Engine"
10) U.S. Pat. No. 4,305,349 issued to Herald Zinunerly on Dec. 15, 1981 for "Internal Combustion Engine"
9) U.S. Pat. No. 4,248,183 issued to Noguchi et al of Japan on Feb. 3, 1981 for "Two Stroke Cycle Diesel Engine"
8) U.S. Pat. No. 4,215,660 issued to Donald Finley on Aug. 5, 1980 for "Internal Combustion Engine"
7) U.S. Pat. No. 4,129,102 issued to Cornelis Van der Lely of Switzerland on Dec. 12, 1978 for "Opposed Piston Engine"
6) U.S. Pat. No. 4,115,037 issued to Stanley Butler on Sep. 19, 1978 for "Opposed Piston Internal Combustion Engine Driven Pump"
5) U.S. Pat. No. 3,868,931 issued to Dutry et al of Belgium on Mar. 4, 1975 for "Internal Combustion Engine"
4) U.S. Pat. No. 3,866,581 issued to William Herbert on Feb. 18, 1975 for "Opposed Piston Engine"
3) U.S. Pat. No. 3,847,124 issued to Louis Kramer on Nov. 12, 1974 for "Internal Combustion Engine"
2) U.S. Pat. No. 3,824,970 issued to Ernest Amery on Jul. 23, 1974 for "Internal Combustion Engine"
1) U.S. Pat. No. 3,604,204 issued to Conrad & Muller both of Germany on Sep. 14, 1971 for "Counterpiston Machine or Motor"

Furthermore the inventor is intimately familiar with the prior art. The problem with some prior art devices is that they are complex, cumbersome, expensive, inefficient and for some applications not practical enough.

Unfortunately none of the prior art devices singly or even in combination meet all of the objectives established by the inventor for this Dual Rocker shaft Internal Combustion Diesel Engine.

OBJECTIVES

1. It is an objective of this invention to provide a more efficient internal combustion diesel engine.
2. Another objective of this invention is to provide a diesel engine for ground transportation that utilizes a dual rocker shaft.
3. Another objective of this invention is that the dual rocker shaft of this invention comprises a shaft inside another shaft.
4. Another objective of this invention is that it use fewer moving parts.
5. Another objective of this invention is that its engine entail a smaller footprint.
6. Another objective of this invention is that the engine be safe and stable, reliable and affordable.
7. Another objective of this invention is that the engine of this invention be light weight.
8. Another objective of this engine is that it entail less noise and less vibration.
9. Another objective of this invention is that it be environmentally safe.
10. Another objective of this invention is that it be physically safe in normal environment as well as accidental situations.
11. Another objective of this invention is that it consume less energy than comparable engines.
12. Another objective of this invention is that it be easy to use and maintain.
13. Another objective of this system is that it be reliable and long lasting.
14. Another objective of this invention is that it meet all federal, state, local and other private standards guidelines, regulations and recommendations with respect to safety, environment, energy consumption.
15. Another objective of this invention is that it provide for greater payload by reduction of its empty weight.
16. Another objective of this invention is that it have lower down time or in other words require fewer maintenance hours.
17. Another objective of this invention is to lower the center of gravity.
18. Another objective of this invention is that its exhaust fumes be safe.
19. Another objective of this invention is that it provide a wider range of RPM (Revolutions Per Minute) for the same size and power.
20. Another objective of this engine is that it work within itself, that is all action work toward opposite action.

Other objectives of this invention reside in its simplicity, elegance of design, ease of manufacture, service and use and even aesthetics as will become apparent from the following brief description of the drawing and detailed description of the preferred embodiment.

BRIEF DESCRIPTION OF THE DRAWINGS

The objects, features and advantages of the present invention and its application will be more readily appreciated when read in conjunction with the accompanying drawing, in which:

g)
FIG. 7 is a timing diagram which shows a miniature version of FIG. 5 (engine being viewed from rear with rear half of the block removed) wherein
   (i) FIG. 7 (a) shows crankshaft at zero degrees
   (ii) FIG. 7 (b) shows crank shaft at 90 degrees
   (iii) FIG. 7 (c) shows crankshaft at 180 degrees
   (iv) FIG. 7 (d) shows crankshaft at 270 degrees h)

DETAILED DESCRIPTION OF THE DUAL ROCKER SHAFT DIESEL ENGINE

Figure 1:
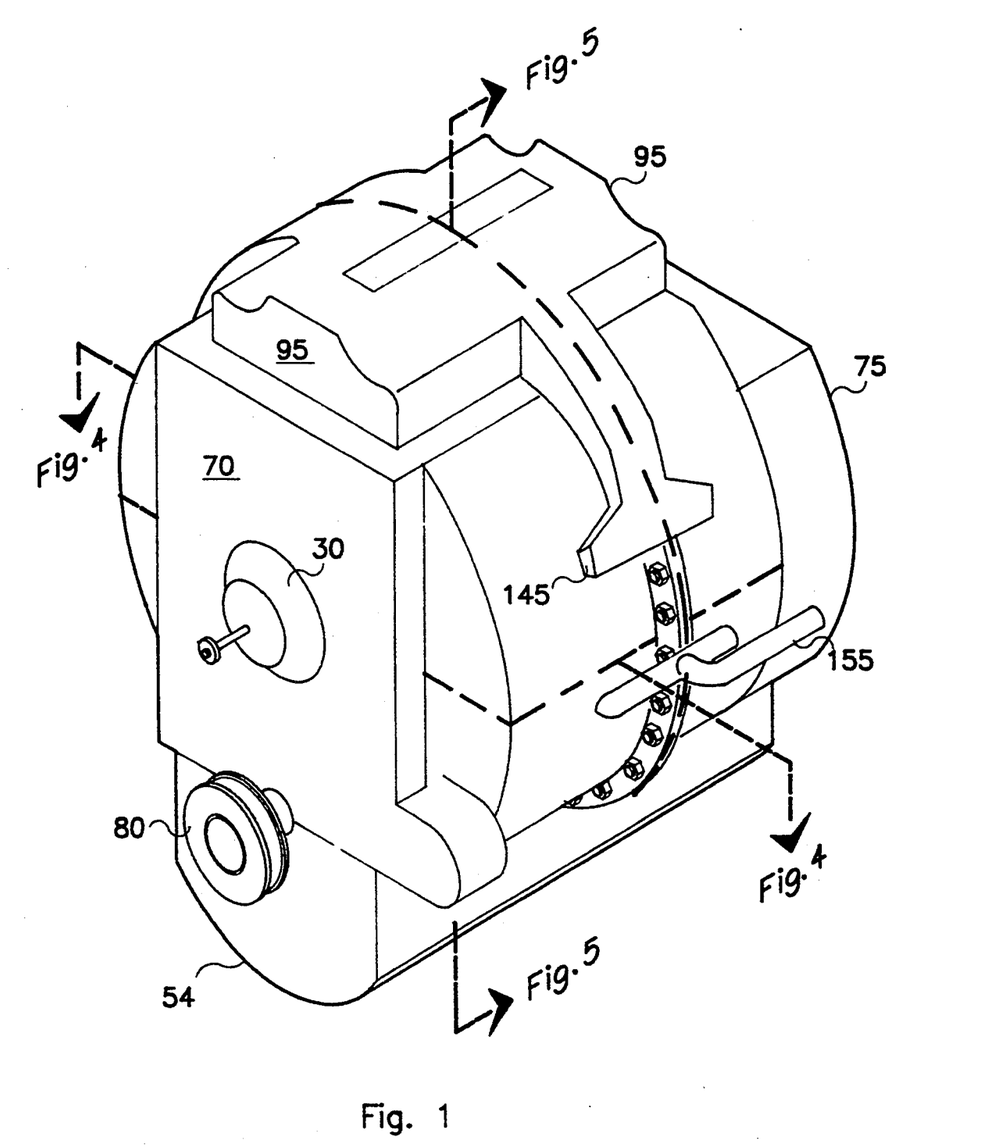
FIG. 1 is an isometric perspective view of the dual rocker shaft internal combustion diesel engine of this invention.
b) FIG. 2 (*a*), (*b*), & (*c*) respectively shows top, front and side views of the dual internal combustion diesel engine of this invention.
Figure 2A:
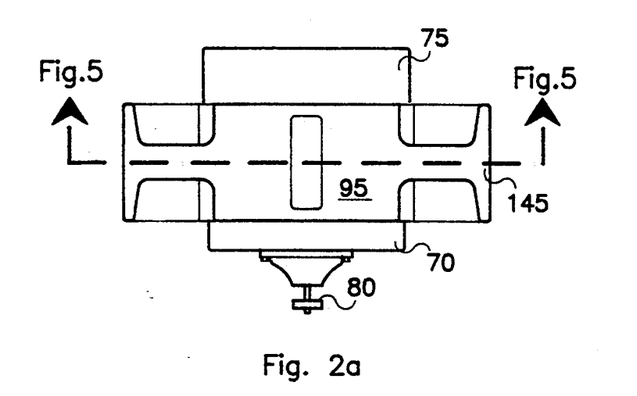
Figure 2B:
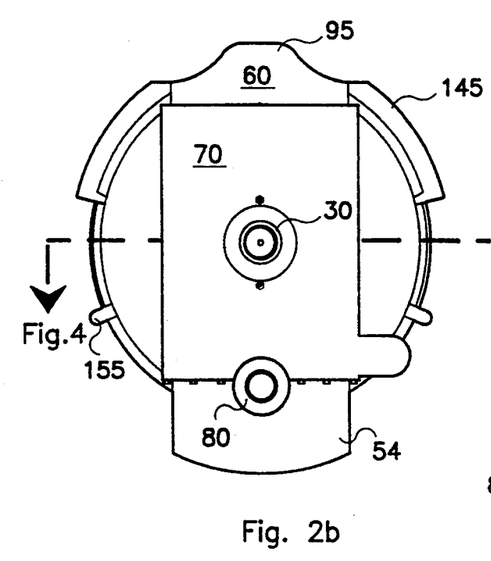
Figure 2C:
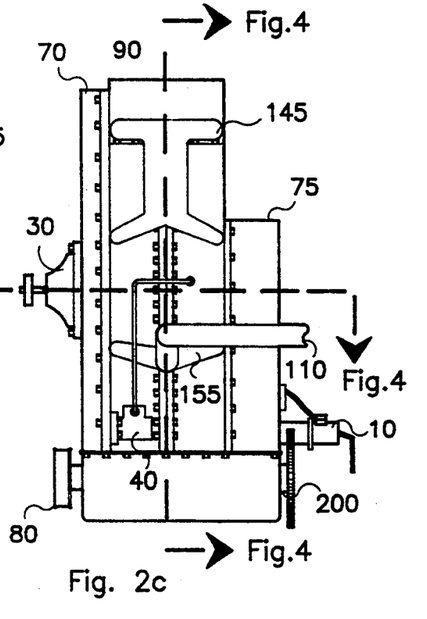

As shown in FIG. 1 & 2 the dual rocker shaft internal combustion diesel engine of this invention comprises plurality of components from the prior art internal combustion engines such as starter 10, alternator (not shown), water pump 30, fuel pump 40, oil pump (not shown), and blower 60, as well as a plurality of parts which are new, different and unique to this invention as delineated below.

FIG. 1 also shows removable front cover 70, removable crank case cover 75, removable top cover 95, an accessory drive pulley 80 intake manifold 145 and exhaust manifold 155. FIG. 2 (a), (b), (c) respectively show top front and side views, but the side view can be better seen in FIG. 3 which is an enlarged version of FIG. 2 (c).

Figure 3:
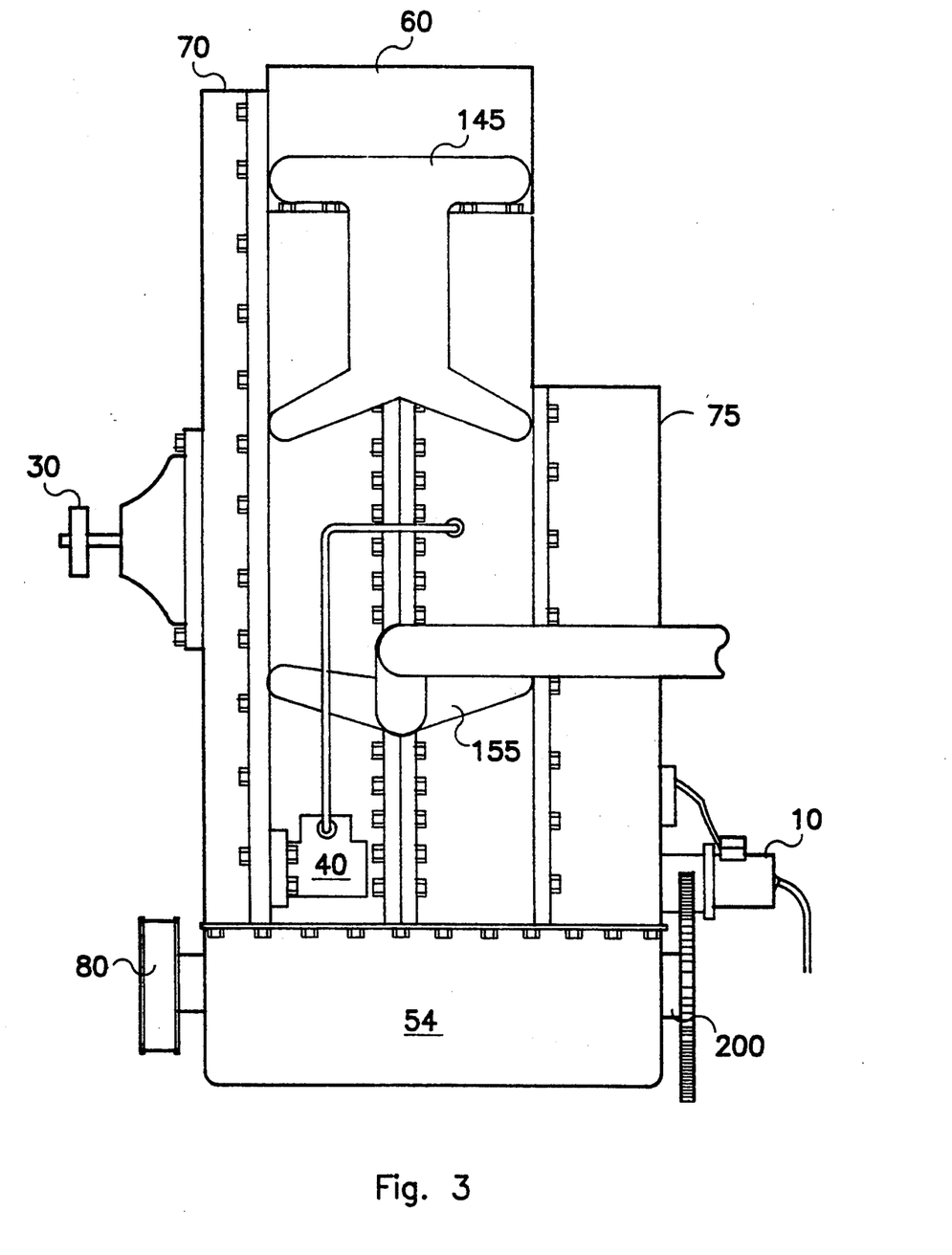
FIG. 3 is a more detailed side view of the dual internal combustion diesel engine of this invention.

In addition to the components seen in FIG. 1 & 2 the FIG. 3 also shows the starter 10, injection pump 40 and its interface to fuel injector 42, the blower 60, and its interface to intake manifold 145, the exhaust manifold 155, and the crank shaft 200 for turning reciprocating two and fro motion into rotary motion.

Figure 4:
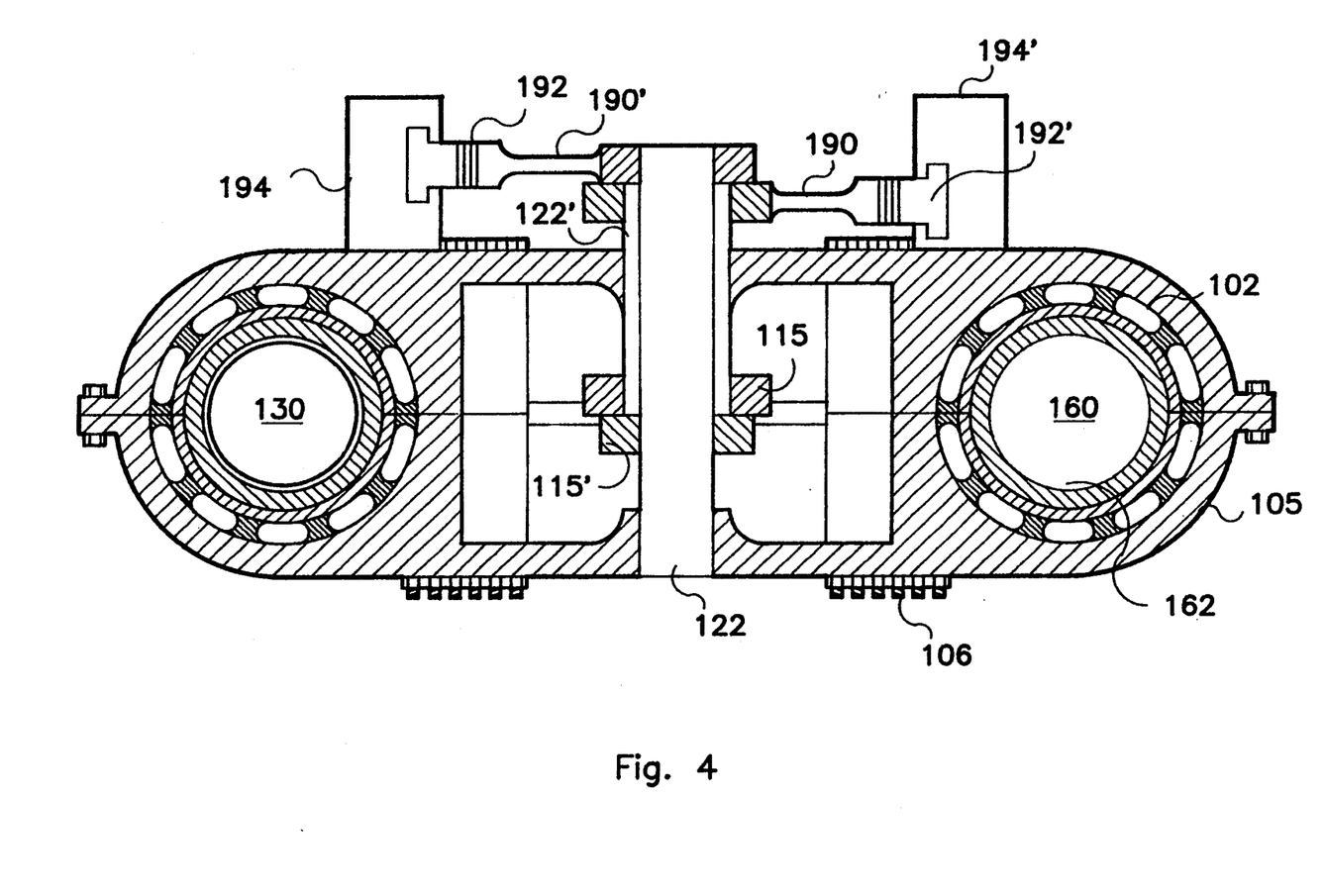
FIG. 4 is a cross-sectional top view along lines 4—4 of FIG. 1 and 2.

FIG. 4 is a top view of the engine which also shows piston 130, cylinder 160, inner shaft of dual rocker shaft 122, inner rocker arm with racks 190, slide rack 192 associated with inner rocker arm and fixed slide block 194 also associated with rocker arm connected to the inner dual rocker shaft. Similarly FIG. 4 also shows outer rocker arm with rack 190', slide rack 192' associated with outer rocker arm and fixed slide block 194' also associated with the rocker arm connected to the outer shaft of dual rocker shaft 122'.

The four piston two common cylinder configuration of this engine 100 comprises two halves of the engine block 105 of the engine 100, wherein the pair of sleeves 162 form the cylinders 160 which are separate from the engine block. The inventor in the preferred embodiment made the two halves of the engine 105 by iron castings but other methods can also be not only adequate but effective. The engine block is water cooled 102 in the vicinity of the combustion areas so as not to cause overheating of the engine.

FIGS. 5 through 8 aid in understanding the construction and the operation of the engine as will become apparent from the following details.

Figure 5:
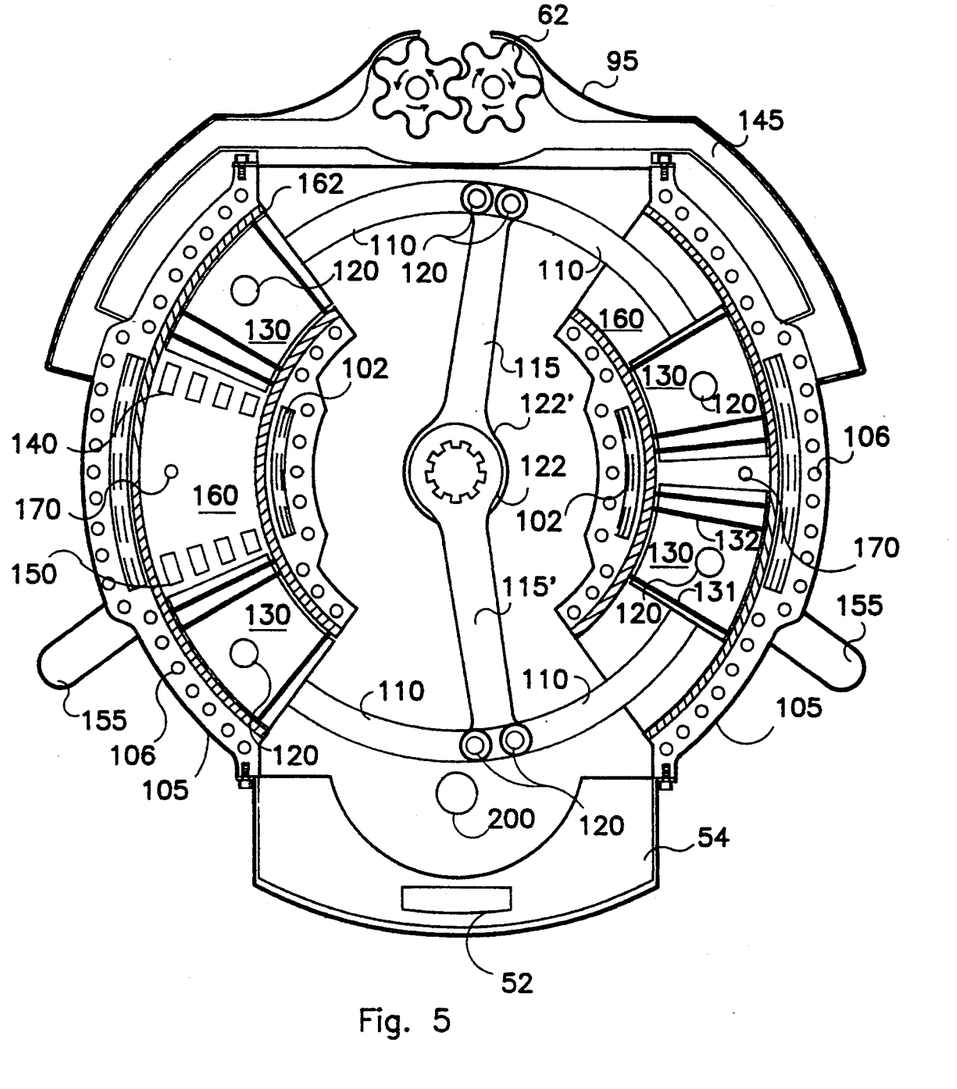
FIG. 5 is a cross-sectional front view along lines 5—5 of FIG. 1 and 2.

FIG. 5 is a cross-sectional front view along lines 5—5 of FIG. 1 and 2.

Figure 6:
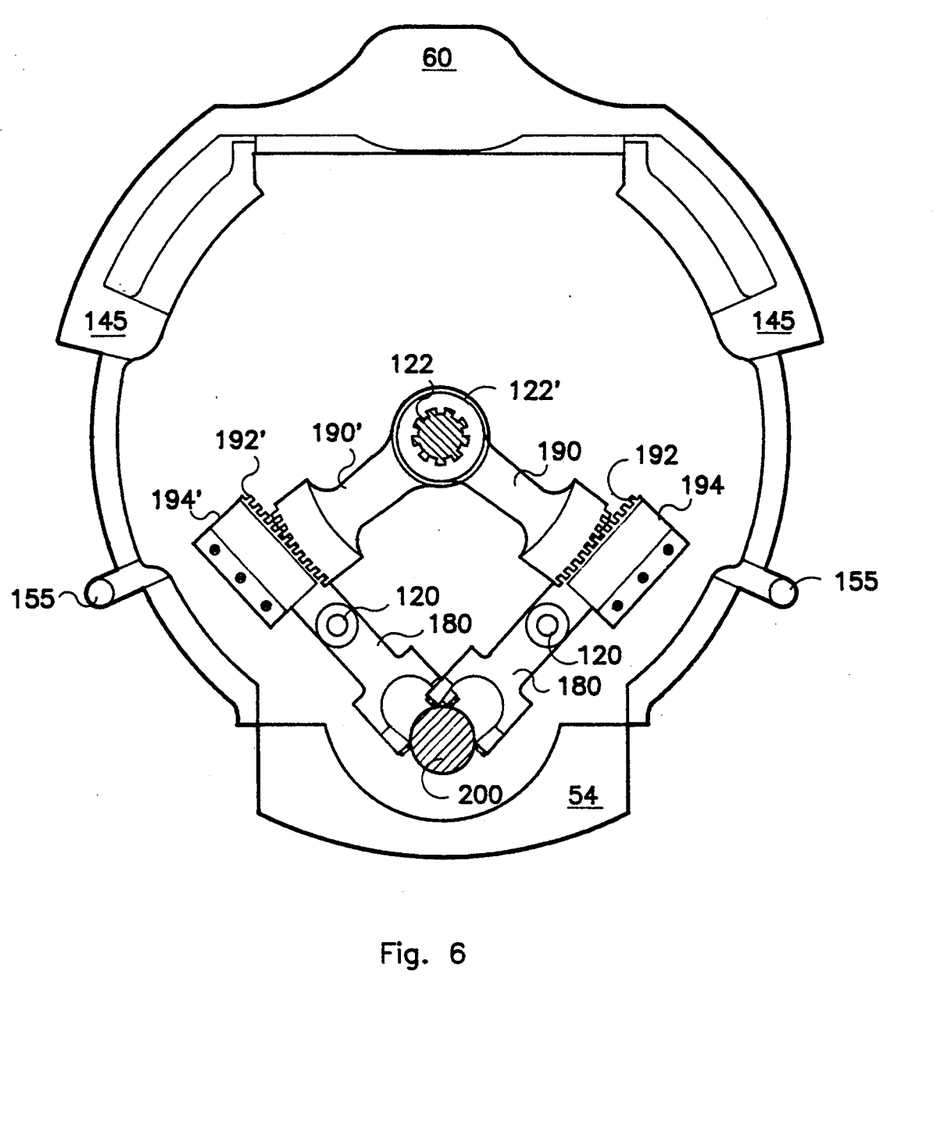
FIG. 6 is a closeup rear view which shows the rear half of the engine with rear crank case cover removed.

Furthermore FIG. 6 is a closeup rear view which shows the rear half of the engine with rear crank case cover removed.

Similarly FIG. 7 is a timing diagram which is rough and miniature integration of FIG. 5 (engine being viewed from rear with rear half of the block removed) and FIG. 6 which is a close up rear view.

Figure 7A:
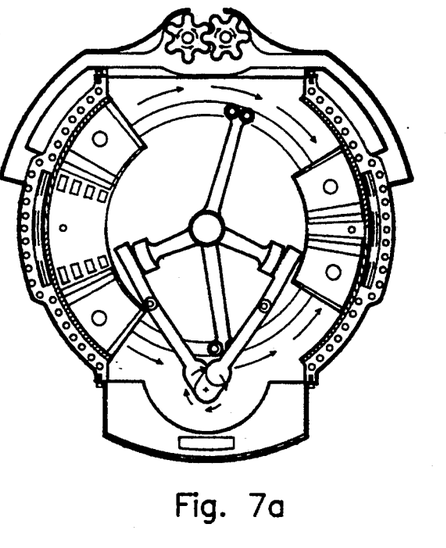
Figure 8:
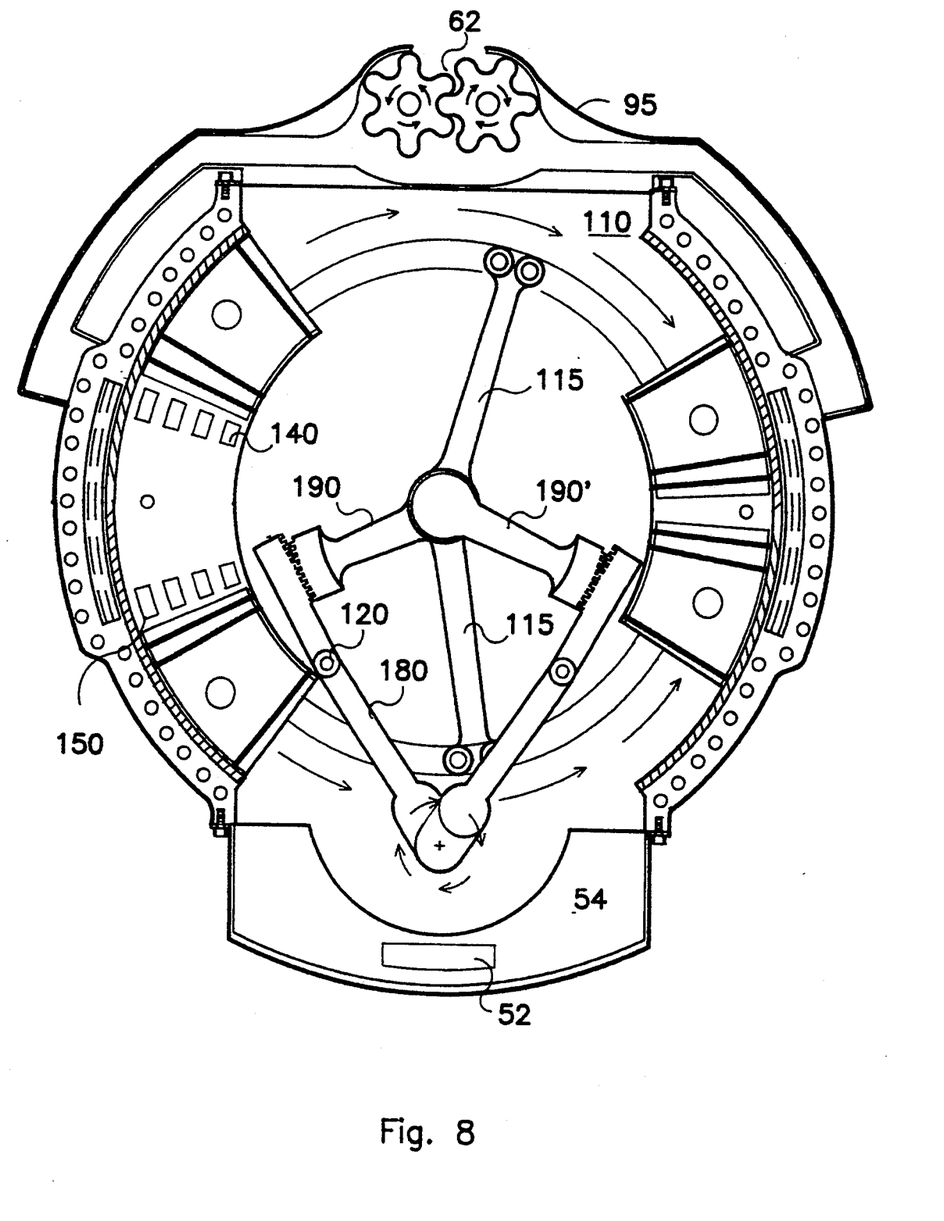
FIG. 8 shows an enlarged view of FIG. 7(a) for ease of comprehending the operation of the engine.

FIG. 7 (a) shows crankshaft at zero degrees which is also a miniature version of FIG. 8.

FIG. 7 (b) shows crank shaft at 90 degrees.

FIG. 7 (c) shows crankshaft at 180 degrees.

FIG. 7 (d) shows crankshaft at 270 degrees.

Finally FIG. 8 shows an enlarged view of FIG. 7(a) for ease of comprehending the operation of the engine.

In addition to the two common cylinders 160 the dual rocker shaft internal combustion diesel engine 100 of this invention comprises four pistons 130, plurality (four in the preferred embodiment) of connecting rods 110 for connecting pistons 130 to dual rocker arms 115, a single dual throw crank shaft 200 which transforms reciprocating motion into rotary motion, a center dual rocker shaft (one shaft inside of another shaft) 122, 122', two racked or geared rocker arms 190 and 190', (first connected to inner rocker shaft 122 and the other connected to the outer rocker shaft 122'), two crankshaft connecting rods 180, two slider racked or geared slides 192 and concomitant pair of slide blocks 194 as well as intake and exhaust manifolds 145 and 155 respectively.

For ease of comprehension the reference numerals associated with components associated with the outer shaft are primed. For example 192' denotes slide rack associated with rocker arm 190' which in turn is associated with outer shaft 122' of the dual rocker shaft 122, 122'.

The four pistons 130 which receive the action of the expanding gases caused by the combustion of the fuel in turn comprise plurality of rings 131, 132. In the preferred embodiment the inventor used one lower ring 131 and two upper rings 132 but a different arrangement can easily be contrived with equal effectiveness.

The two cylinders 160 are formed by pair of sleeves 162 in the engine block but are separate from the block 105. The sleeves 162 are held in position and supported by the two halves of the engine block 105 to form two cylinders 160. A pair of fuel injectors 170 inject the fuel into the cylinders for combustion which in turn pushes the pistons outward.

The engine 100 is best assembled by inserting all its inward working parts, such as sleeves 162, pistons 130, crank shaft 200 and connecting rods 110 in each half of the engine 105 and then bolting together said two halves of the engine 105 into a unitary whole engine 100 of this invention.

The engine is fabricated in two halves for ease of assembly and necessary machining of parts. The two halves of the engine blocks are cooled as shown in various figures by reference number 102. Fasteners 106 facilitate joining together of the two halves of the engine block 105 to form a unitary whole engine 100 of this invention.

A removable oil pan or sump 54 and removable upper cover 70 give access to the connecting rods 110, oil pump 50, and related service. The removable oil pan or sump 54 gives access to crank shaft bearings and oil pump. 52 is the screen for the oil pump. It is also the point of pick up of cleaned and screened oil for the oil pump 50 which in turn supplies the necessary oil to the bearings and other areas of friction.

The impellers 62 of the engine driven blower 60 provide a charged air supply to cylinders via charged intake air manifolds 145 which in turn connect to intake ports 140. Similarly exhaust ports 150 have associated exhaust manifold 155 which collects exhaust gases and channels the same for discharge through a muffler or other suitable anti noise technology for noise reduction.

Naturally the dual rocker shaft internal combustion of this invention also has many essential conventional components necessary for any internal combustion engine including but not limited to starter 10, alternator (not shown), water pump 30, fuel injection pump 40, oil pump (not shown), and blower 60, air filter (not shown).

OPERATION

The timing diagram of FIG. 7 shows the operation of the Conpaar diesel engine of this invention with associated characteristics as follows.

1. The crankshaft at zero degrees as shown in FIG. 7(a) is characterized by left cylinder being recharged, the left intake ports are charged supplying a new supply of air since the piston has traveled beyond the position of the intake ports, which will be shortly shut off again as the piston once again returns to cover the intake ports, left exhaust ports are also open allowing the engine to scavenge because the piston has dropped below the level of the exhaust ports, fuel being injected and burned in the right cylinder, the right intake and exhaust ports are closed such that this cylinder is ready for combustion and pushing away of the pistons with no escape through any ports which are all covered by the piston 130.

Figure 7B:
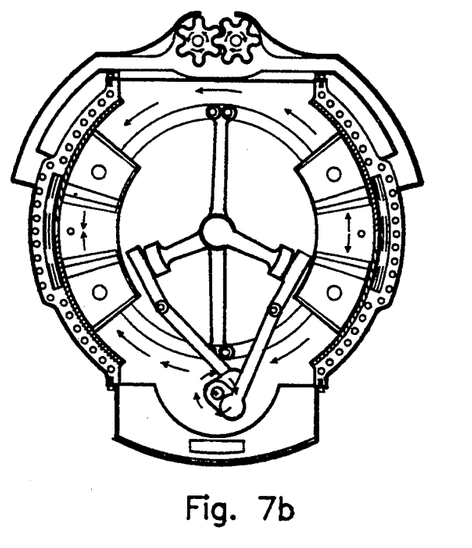

2. The crank shaft at 90 degrees as shown in FIG. 7 (b) is characterized by all intake and exhaust ports closed in both the left and the right cylinders. The air is being compressed in the left cylinder and the right cylinder is undergoing power stroke as the air is being heated and expanded.

Figure 7C:
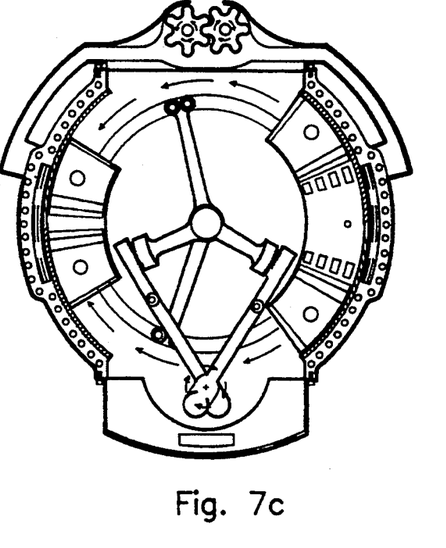

3. The crankshaft at 180 degrees in FIG. 7 (c) is characterized by right cylinder being recharged, the right intake ports are charged supplying a new supply of air since the piston has traveled beyond the position of the intake ports, which will be shortly shut off again as the piston once again returns to cover the intake ports, right exhaust ports are also open allowing the engine to scavenge because the piston has dropped below the level of the exhaust ports, fuel being injected and burned in the left cylinder, the left intake and exhaust ports are closed such that this cylinder is ready for combustion and pushing away of the pistons with no escape through any ports which are all covered by the piston 130.

Figure 7D:
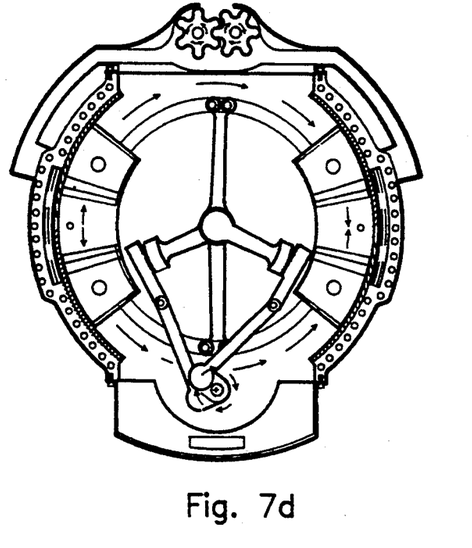

4. The crank shaft at 270 degrees as shown in FIG. 7 (d) is characterized by all intake and exhaust ports closed in both the left and the right cylinders. The air is being compressed in the right cylinder and the left cylinder is undergoing power stroke as the air is being heated and expanded.

Ninety degrees later the crankshaft is again at 360 which is the same as zero degrees as shown in FIG. 7 (a) and the cycle repeats itself.

NOTE-1: It should be noted that in all four cases described above the exhaust ports are open or exposed just slightly before the intake ports are opened, thus allowing the pressure to be relieved so that when the intake port is opened there is no back pressure.

NOTE-2: Note the direct relationship between racked rocker arm 190 and rocker arm 115 to each other where in one pair of connecting members (115,190) in the vicinity of the 4th quadrant (also known as northwest quadrant) is linked by outer shaft of the dual rocker shaft and the other pair of connecting members (115',190') in the vicinity of the second quadrant (also known as southeast quadrant) is linked by the inner shaft of the dual rocker shaft.

NOTE-3: For ease of understanding it should also be noted that the FIG. 7 a and c are similar except right and left are reversed. Similarly FIG. 7 (b) and (d) are similar except that actions of the right and left piston are reversed.

The conpaar engine is used in any way an internal combustion engine of the prior art is used. It can be built larger or smaller to suite the specific requirements of the application. The inventor has taught a 4 piston two cylinder configuration but it can be built in a series of 4 piston two cylinder engines with linked power crank shaft, so as to provide even greater power. Because of the smaller footprint it is also suitable for automobile and other ground transportation.

The inventor has given a non-limiting description of the concept. Many changes may be made to this design without deviating from the spirit of the concept of this invention. Examples of such contemplated variations include the following.

a) The dual rocker shaft arrangement may be varied without deviating from its essential purpose as described.

b) Plurality of these engines may be linked in series via the power crank shaft so as to provide even greater power.

c) The displacement of the engine may be varied to specifically adapt for different applications.

d) The engine may be adapted for other applications of converting chemical energy into mechanical and/or electrical energy for real time use or batch use after storage.

e) The overall macro shape, permutation and combination of the components of the engine may be varied.

f) The micro shape of some of the components may be varied.

Other changes such as aesthetic and substitution of newer materials as they become available which substantially perform the same function in substantially the same manner with substantially the same result without deviating from the spirit of this invention may be made.

Following is a listing of the components used in this embodiment arranged in ascending order of the reference numerals for ready reference of the reader.

10=Starter
30=Water pump
40=Fuel injection pump
42=Fuel Injectors
52=Screen for the oil pump
54=Oil pan or oil sump
60=Engine driven blower
62=Impellers of the engine driven blower
70=Removable front cover
75=Removable crank case cover
80=Accessory drive pulley
95=Removable engine driven blower housing also forming top cover of the engine
100=Diesel engine as a whole
102=Engine block water cooling path
105=Two halves of the diesel engine block
106=Means for fastening two halves of the engine block 110=Four Connecting Rods for connecting pistons 130 to rocker arms 115
115=Two rocker arms for connecting, connecting rods 110 to dual rocker shaft 122,122'
120=Connecting Pivot Pins
122=Inner rocker shaft locked to the rocker arms, receives back and forth motion.
122'=Outer rocker shaft also locked to the rocker arms and receives back and forth motion.
130=Four Pistons
131=Single lower piston ring
132=Double upper piston ring
140=Charged intake ports
145=Charged intake air manifold
150=Exhaust ports
155=Exhaust manifold which collects exhaust gases for discharge peacefully
160=Two cylinders
162=Pair of sleeves which forms cylinder held in position by the two halves of the engine block.
170=Fuel Injectors inject the fuel into the cylinder for combustion
180=Two crank shaft connecting rods
190=Two racked rocker arms which connect racked or geared slide 192 to dual rocker shaft 122,122'
192=Racked or geared slide
194=Fixed slide block supporting the racked or geared slide
200=Crank shaft which transforms reciprocating motion into rotary motion While this invention has been described with reference to illustrative embodiments, this description is not intended to be construed in a limiting sense. Various modifications and combinations of the illustrative embodiments as well as other embodiments of the invention will be apparent to person skilled in the art upon reference to this description. It is therefore contemplated that the appended claims cover any such modifications, and/or embodiments that fall within the true scope of the invention.

What is claimed is:

1. A dual rocker shaft internal combustion diesel engine comprising:
   a) a first means for generating a rocker to and fro motion; and
   b) a second means for converting said rocker to and fro motion to rotary motion connected to said first means for generating a rocker to and fro motion, wherein further;
   c) said first means for generating a rocker to and fro motion comprises a dual rocker shaft in turn comprising a first shaft within a second shaft; and
   d) said second means for converting said rocker to and fro motion to rotary motion comprises a single dual throw crank shaft connected to said dual rocker shaft.

2. The dual rocker shaft internal combustion diesel engine of claim 1 further comprising:
   a) a plurality of racked arms locked to said dual rocker shaft;
   b) a plurality of racked slides also connected to said racked arms such that said racked arms are the connecting link between said dual rocker shaft and said plurality of racked slides; and
   c) a plurality of fixed blocks supporting said plurality of racked slides.

3. The dual rocker shaft internal combustion diesel engine of claim 2 wherein said plurality of racked arms are two, said plurality of racked slides are two and said plurality of fixed blocks are two.

4. The dual rocker shaft internal combustion diesel engine of claim 3 further comprising:
   a) four pistons connected to said dual rocker shaft via four connecting rods and two rocker arms; and
   b) two cylinders each engaging two of said pistons.

5. The dual rocker shaft internal combustion diesel engine of claim 4 wherein said cylinders are each formed by a pair of sleeves held in position by two halves of the engine block.

6. The dual rocker shaft internal combustion diesel engine of claim 5 further comprising:
   a) a fuel injector means for injecting fuel into said cylinders;
   b) a plurality of intake ports connected to said cylinders;
   c) a plurality of exhaust ports connected to said cylinders
   d) an intake manifold connected to said intake ports; and
   e) an exhaust manifold connected to said exhaust ports.

7. The dual rocker shaft internal combustion diesel engine of claim 6 further comprising a starter, a fuel pump, a water pump, an oil pump, and an engine driven blower.

8. A dual rocker shaft internal combustion diesel engine comprising:
   a) a dual rocker shaft having a first shaft inside a second shaft;
   b) a single dual throw crankshaft connected to said dual rocker shaft;
   c) a plurality of racked arms locked to said dual rocker shaft;
   d) a plurality of racked slides also connected to said racked arms such that said racked arms are the connecting link between said dual rocker shaft and said plurality of racked slides; and
   e) a plurality of fixed blocks supporting said plurality of racked slides.

9. The dual rocker shaft internal combustion diesel engine of claim 8 wherein said plurality of racked arms are two, said plurality of racked slides are two and said plurality of fixed blocks are two.

10. The dual rocker shaft internal combustion diesel engine of claim 9 further comprising:
    a) four pistons connected to said dual rocker shaft via four connecting rods and two rocker arms; and
    b) two cylinders each engaging two said pistons.

11. The dual rocker shaft internal combustion diesel engine of claim 10 wherein said cylinders are each formed by a pair of sleeves held in position by two halves of the engine block.

12. The dual rocker shaft internal combustion diesel engine of claim 11 further comprising:
    a) a fuel injector means for injecting fuel into said cylinders;
    b) a plurality of intake ports connected to said cylinders;
    c) a plurality of exhaust ports connected to said cylinders;
    d) an intake manifold connected to said intake ports; and
    e) an exhaust manifold connected to said exhaust ports.

13. The dual rocker shaft internal combustion diesel engine of claim 9 wherein:

a) one of said two racked arms is connected to said first inner shaft and the other of said two racked arms is connected to said second outer shaft; and b) said single dual throw crank shaft is connected in one throw to said first inner shaft and in the other throw to said second outer shaft.

14. A dual rocker shaft internal combustion diesel engine process of converting chemical energy into mechanical energy comprising the steps of:

a) driving a plurality of pistons in rotary cylinders to generate a rocker to and fro motion;

b) converting said rocker to and fro motion to rotary motion, wherein further;

c) said rocker to and fro motion is generated by a dual rocker shaft in turn comprising a first shaft within a second shaft; and d) said rocker to and fro motion is converted to rotary motion via a single dual throw crank shaft.

15. The dual rocker shaft internal combustion diesel engine process of converting chemical energy into mechanical energy of claim 14 including the steps of:

a) locking a plurality of racked arms to said dual rocker shaft;

b) connecting a plurality of racked slides to said racked arms such that said racked arms are the connecting link between said dual rocker shaft and said plurality of racked slides; and c) supporting said plurality of racked slides by a plurality of fixed blocks.

16. The dual rocker shaft internal combustion diesel engine process of converting chemical energy into mechanical energy of claim 15 wherein said plurality of racked arms are two, said plurality of racked slides are two and said plurality of fixed blocks are two.

17. The dual rocker shaft internal combustion diesel engine process of converting chemical energy into mechanical energy of claim 35 including the steps of:

a) connecting four pistons to said dual rocker shaft via four connecting rods and two rocker arms; and b) engaging two piston of said four pistons in a cylinder.

18. The dual rocker shaft internal combustion diesel engine process of converting chemical energy into mechanical energy of claim 16 wherein said cylinders are each formed by a pair of sleeves held in position by two halves of the engine block.

* * * * *